(12) United States Patent
Fujiwara et al.

(10) Patent No.: US 11,770,057 B2
(45) Date of Patent: Sep. 26, 2023

(54) METHOD OF PREHEATING UNFINISHED STATOR

(71) Applicant: TOYO ELECTRIC MFG. CO., LTD., Tokyo (JP)

(72) Inventors: Kenji Fujiwara, Kanagawa (JP); Yoshihiro Okamoto, Kanagawa (JP); Yoshihisa Hojo, Kanagawa (JP); Keiichi Morinaga, Kanagawa (JP); Yuya Iwamoto, Kanagawa (JP); Kyouji Okamoto, Kanagawa (JP)

(73) Assignee: TOYO ELECTRIC MFG. CO., LTD., Tokyo (JP)

( * ) Notice: Subject to any disclaimer, the term of this patent is extended or adjusted under 35 U.S.C. 154(b) by 0 days.

(21) Appl. No.: 17/771,248

(22) PCT Filed: Jul. 9, 2020

(86) PCT No.: PCT/JP2020/026923
§ 371 (c)(1),
(2) Date: Apr. 22, 2022

(87) PCT Pub. No.: WO2021/084808
PCT Pub. Date: May 6, 2021

(65) Prior Publication Data
US 2022/0416631 A1 Dec. 29, 2022

(30) Foreign Application Priority Data
Oct. 28, 2019 (JP) .................. 2019-194920

(51) Int. Cl.
*H02K 15/12* (2006.01)
*H02K 15/10* (2006.01)
(52) U.S. Cl.
CPC ........... *H02K 15/12* (2013.01); *H02K 15/105* (2013.01); *Y10T 29/49009* (2015.01)

(58) Field of Classification Search
CPC .... H02K 15/0012; H02K 15/10; H02K 15/21; Y10T 29/49009; Y10T 29/53143
(Continued)

(56) References Cited

U.S. PATENT DOCUMENTS

| | | | |
|---|---|---|---|
| 8,925,182 B2 * | 1/2015 | Wang ................. | H02K 15/0012 164/109 |
| 10,249,519 B2 * | 4/2019 | Abe ..................... | H05B 3/0047 |
| 11,196,326 B2 | 12/2021 | Fujiwara et al. | |

FOREIGN PATENT DOCUMENTS

| | | |
|---|---|---|
| JP | 2003-304671 A | 10/2003 |
| JP | 2005-006423 A | 1/2005 |

(Continued)

OTHER PUBLICATIONS

International Search Report for PCT Patent App. No. PCT/JP2020/026923 (dated Sep. 15, 2020).

*Primary Examiner* — Thiem D Phan
(74) *Attorney, Agent, or Firm* — Cermak Nakajima & McGowan LLP; Tomoko Nakajima

(57) ABSTRACT

A method of preheating an unfinished stator as an intermediate product before a stator as a final product for a motor is provided in order to preheat a mold for molding together with the unfinished stator in short time by using preheating facilities with simplified structures. In the method, the mold has a hollow and longitudinal barrel portion and a flange portion extending outward from an end of the barrel portion. The flange portion is arranged at a horizontal position to turn the barrel portion upward and an end of a cylindrical and longitudinal frame is put on the flange portion in a state where a core of the unfinished stator is fitted in the frame. A heat-resistant box of which an underside is opened covers the frame and the mold to surrounded outsides of the frame and the mold.

2 Claims, 2 Drawing Sheets

(58) Field of Classification Search
USPC ....... 29/596, 33 K, 598, 604, 609, 721, 729, 29/732
See application file for complete search history.

(56) References Cited

FOREIGN PATENT DOCUMENTS

| | | |
|---|---|---|
| JP | 2008-154348 A | 8/2008 |
| JP | 2019-103304 A | 6/2019 |
| JP | 2019-140880 A | 8/2019 |

* cited by examiner

METHOD OF PREHEATING UNFINISHED STATOR

This application is a national phase entry under 35 U.S.C. § 371 of PCT Patent Application No. PCT/JP2020/026923, filed on Jul. 9, 2020, which claims priority under 35 U.S.C. § 119 to Japanese Patent Application No. 2019-194920, filed Oct. 28, 2019, both of which are incorporated by reference.

TECHNICAL FIELD

The invention relates to a method of preheating an unfinished stator for a motor, as a premise that the unfinished stator is an intermediate product before a stator as a final product and the stator comprises a core in which a plurality of annular electromagnetic steel sheets are laminated and coils bound at a plurality of grooves formed at an inner peripheral portion of the core at a predetermined distance. In the method, the unfinished stator is preheated before being performed molding in which an insulative resin is injected in at least clearances between the core and the coils and is cured.

BACKGROUND ART

Conventionally, as this kind of the method preheating the unfinished stator, there has been known the method in which the unfinished stator is preheated by turning on alternating current (hereinafter referred to AC) to the coils. See Reference No. 1.

On the other hand, there is a problem that it takes a lot of time to heat the core uniformly from an inner peripheral portion to an outer peripheral portion by electrical heating of the coils. In order to solve the above-mentioned problem, a heater is provided with a region of at least an upper mold or a lower mold each of which is used only for preheating the unfinished stator in the method disclosed in Reference No. 1. The above-identified region clamps the outer peripheral portion of the coil and the outer peripheral portion of the core is directly heated by the heater. Thus, time taken to preheat the core is shortened.

However, a mold used for molding after preheating is excluded from the preheating in the method disclosed in Reference No. 1. Therefore, this brings about a new problem that it is necessary for the mold used for molding to be heated before or in the middle of the molding in addition to the preheating of the unfinished stator. Further, since the heater directly heating the outer peripheral portion of the coil is required for a uniform preheating of the unfinished stator, there is another new problem that structures of preheating facilities are complicated.

REFERENCE

Reference No. 1: JP2008-154348A

SUMMARY OF INVENTION

Technical Problem

In the light of the above-mentioned problems, the invention provides a method of preheating an unfinished stator for a motor, which is able to uniformly preheat a mold for molding together with the unfinished stator in short time by using preheating facilities with simplified structures.

Solution to Problem

To solve the problems above-mentioned, the invention provides a method of preheating an unfinished stator for a motor, as a premise that the unfinished stator is an intermediate product before a stator as a final product and the stator comprises a core in which a plurality of annular electromagnetic steel sheets are laminated and coils bound at a plurality of grooves formed at an inner peripheral portion of the core at a predetermined distance, wherein the unfinished stator is preheated before being performed molding in which an insulative resin is injected in clearances at least between the core and the coils and is cured, and wherein a mold for molding comprises a hollow and longitudinal barrel portion and a flange portion extending outward from an end in a longitudinal direction of the barrel portion, the method comprising the steps of:

arranging the flange portion of the mold for molding at a horizontal position to turn the barrel portion of the mold for the molding upward;

putting an end of a cylindrical and longitudinal frame on the flange portion of the mold for molding in a state where the core of the unfinished stator is fitted in the frame;

covering the frame and the mold for molding with a heat-resistant box of which an underside is opened to surround outsides of the frame and the mold for molding;

turning on an alternative current to the coils in the heat-resistant box to cause the coils to generate heat; and preheating the core, the frame and the mold for molding by the heat which is conducted from the coils.

According to the above-identified invention, the heat which is conducted from the coils efficiently conducts not only the inner peripheral portion of the core but also outer peripheral portion of the core, the frame and the mold for molding, and the mold for molding together with the unfinished stator are uniformly preheated in short time. Further, since only the above-mentioned box is used when preheating, simplification of the preheating facilities is promoted.

In the invention, it is preferable that the alternative current to the coils is tuned off after rising up to a first predetermined temperature, and all of the coils, the core, the frame, and the mold for molding are left as they are till temperature drop down to a second predetermined temperature appropriate to molding. Time of tuning on the AC to the coils becomes shorter and therefore efficiency of the preheating is more improved.

DESCRIPTION OF EMBODIMENTS

Figure 1:
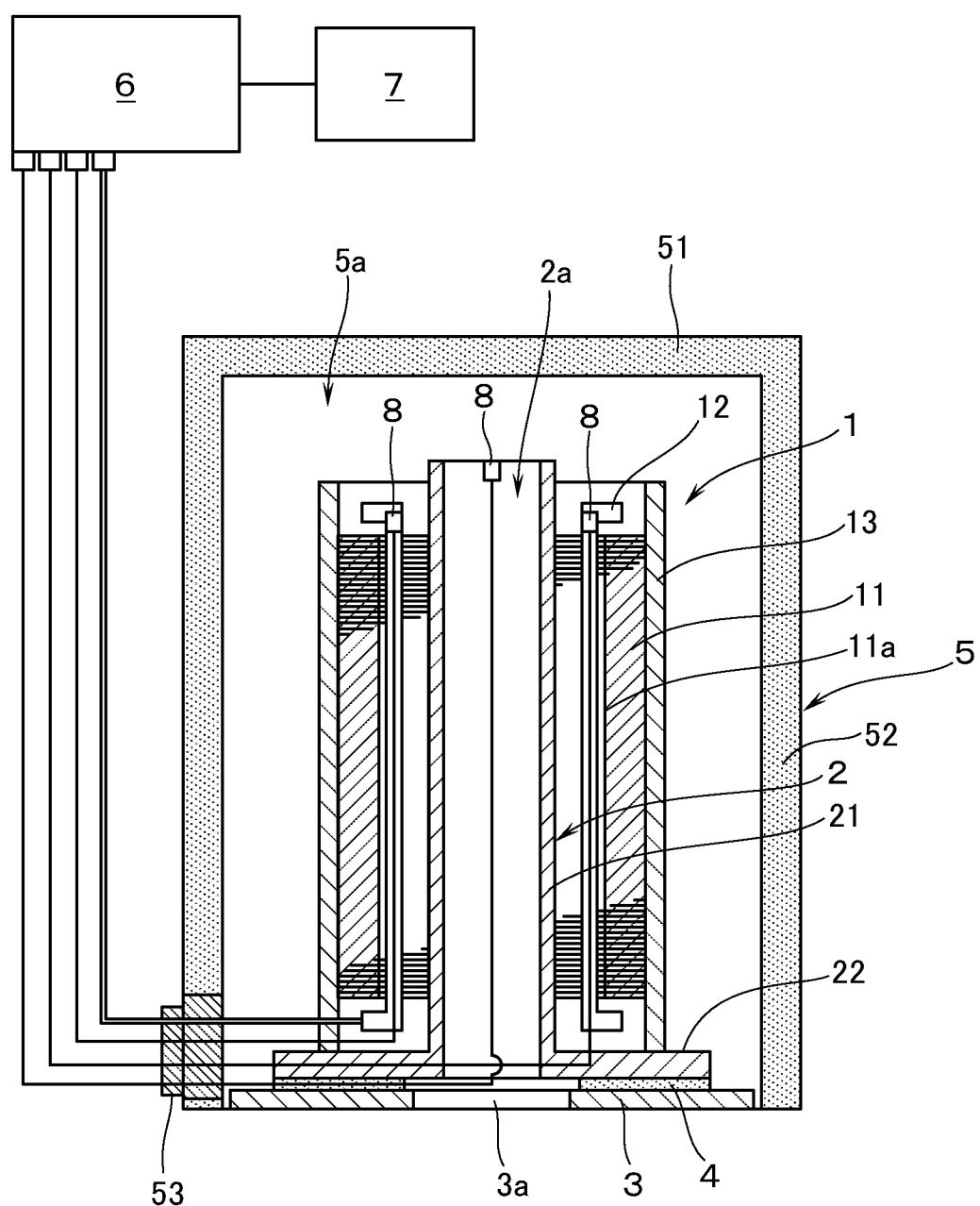
FIG. 1 is a schematic cross section showing an embodiment of a method of preheating an unfinished stator for a motor.

Referring to FIG. 1, an embodiment of a method of preheating an unfinished stator as an intermediate product before a stator as a final product for a motor will be described in detail. The unfinished stator 1 for the motor includes a core 11 in which a plurality of annular electromagnetic steel sheets (not shown) are laminated, coils 12 bound at a plurality of grooves 11a formed at an inner peripheral portion of the core 11 at a predetermined distance, and a cylindrical and longitudinal frame 13. The core 11 is fitted in the frame 13 by shrinkage fit or something else.

A mold 2 for molding used when molding, in which an insulative resin is injected and cured in clearances at least between the core 11 and coils 12, is performed is also preheated at the time of preheating the unfinished stator 1 for the motor. As the clearances, clearances between parts of the core 11 in each of the grooves 11a and each of the coils 12, clearances between one of electric conductors and another of the electric conductors, by which the coils 12 is formed, are illustrated. The mold 2 for molding is a hollow one. A longitudinal and cylindrical barrel portion 21 and a flange portion 22 extending outward from an end in a longitudinal direction of the barrel portion 21 are provided with the mold 2. The flange portion 22 of the mold 2 is arranged at a horizontal position to turn the barrel portion 21 upward when preheating the unfinished stator 1. An annular pallet 3 is used for implementing a stable horizontal arrangement of the flange portion 22.

An opening 3a which communicates with a hollow portion 2a of the mold 2 is provided with the pallet 3. A plurality of heat insulating materials 4 are provided on an outside surface from the opening 3a. Each of the heat insulating materials 4 is arranged on a straight line in a radial direction which passes a center of the opening 3a and a plurality of pairs of the heat insulating materials 4 are constituted by one of the heat insulating materials 4 and the other positioned opposite to the one. The each of the pairs of the heat insulating materials 4 is arranged at a predetermined distance in a circumferential direction of the opening 3a. The flange portion 22 of the mold 2 is arranged at the horizontal position by being put on all of the pairs of the heat insulating materials 4. On the other hand, both the hollow portion 2a of the mold 2 and the opening 3a of the pallet 3 are parts for cooling the unfinished stator 1 together with the mold 2 by flowing such a coolant as air therein after molding and therefore do not relate to the preheating.

An end in the longitudinal direction of the frame 13 is put on the flange portion 22 of the mold 2 by inserting the barrel portion 21 of the mold 2 into the core 11 when preheating the unfinished stator 1. Subsequently, a heat-resistant box 5 of which an underside is opened covers the frame 13 and the mold 2 to surround outsides of the frame 13 and the mold 2. An upper wall portion 51 and side wall portions 52 are provided with the box 5. The upper wall portion 51 and side wall portions 52 are made of a hear insulating material. Any kind of the heat insulating material is not restricted. A connector 53 provided with the box 5 at a lower end portion of at least one of the side wall portions 52. The connector 53 is connectable with a connector (not shown) for turning on an AC, which is provided at a lower end portion of the coils 12. The connector 53 and the connector for turning on the AC to the coils 12 are connected with each other when the frame 13 and the mold 2 are covered with the box 5 from above. The connector 53 is connected with an AC power source 6 for heating and the AC power source 6 is connected with a controller 7 for controlling the turning on or off the AC to the coils 12.

When turning on the AC to the coils 12 via the controller 7, heat is conducted from coils 12 in the box 5, the heat which is conducted from the coils 12 conducts the core 11, the frame 13 and the mold 2, and the core 11, the frame 13 and the mold 2 are preheated by such thermal conduction. Even though the underside of the box 5 is opened, the mold 2 and the pallet 3 exist the hollow portion 2a and the opening 3a, respectively, air existing in the space 5a of the box 5 is heated in association with the heat which is conducted from the coils 12. However, the heated air does not circulate in the box 5. Additionally, since the mold 2 is arranged on the pallet 3 through the heat insulating materials 4, the heat which is conducted from the coils 12 does not conduct the pallet 3.

Figure 2:
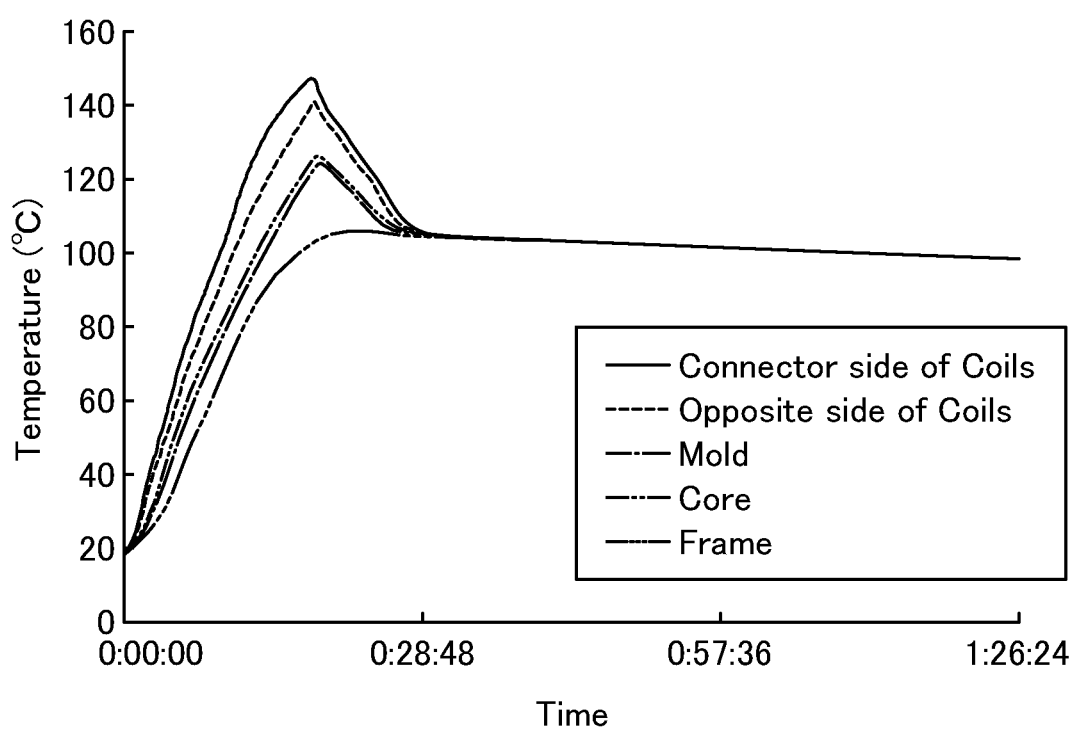
FIG. 2 are graphs showing temperature changes of coils, a mold for molding, a core, and a frame at the time of preheating, respectively.

Referring to FIG. 2, an example of the method of preheating the unfinished stator for the motor shown in FIG. 1. As shown in FIG. 1, a thermal sensor 8 was provided with each of the core 11, the coils 12, the frame 13, and the mold 2 and was connected with the controller 7 via the AC power source 6 in the example. Further each of the temperatures of the core 11, the coils 12, the frame 13, and the mold 2 was also measured by each of the thermal sensors 8 in the example. Positions of the thermal sensors 8 provided with upper end portions of the coils 12 were one upper end portion, which is positioned above a lower portion and at which the connector 53 is connected, and the other upper portion opposite to the above-mentioned one upper portion, which was apart from the one upper portion by a semicircle in the circumferential direction of the unfinished stator 1. A position of the thermal sensor 8 provided with the mold 2 was an upper end portion of the barrel portion 21. A position of the thermal sensor 8 was a lower portion of the frame 13 even though the thermal sensor 8 provided with the frame 13 is not shown in FIG. 1.

The AC current of 23 A is turned on to the coils 12 by supplying a high-frequency power of which a frequency is 590 Hz and an electric power is 1,690 W with the coils 12 from the AC power source 6 through the controller 7. As shown in FIG. 2, since a temperature of the upper end portion of the coils 12 at a side of being turned on the AC reached 150° C. as a first determined temperature after 20 min. and 30 sec., the AC to the coils 12 was turned off by the controller 7. Distributions of temperatures due to differences in a thermal conductivity or something else emerged in temperature changes of the core 11, the coils 12, the frame 13, and the mold 2 in the middle of turning on the AC. All of the temperatures of the core 11, the coils 12, the frame 13, and the mold 2 converged 110° C. after about 10 min. from tuning off the AC to the coils 12. A condition where all of the temperatures of the core 11, the coils 12, the frame 13, and the mold 2 converge maintains as long as the box 5 covers the core 11, the coils 12, the frame 13, and the mold 2.

As described as above-mentioned, according to the embodiment of the method of preheating the unfinished stator 1 for the motor, the heat which is conducted from the coils 12 efficiently conducts not only the inner peripheral portion of the core 11 but also outer peripheral portion of the core 11, the frame 13 and the mold 2, and the mold 2 together with the unfinished stator 1 are uniformly preheated in short time. Further, since only the box 5 is used when preheating, simplification of the preheating facilities is promoted.

Additionally, according to the embodiment of the method of preheating the unfinished stator 1 for the motor, time of tuning on the AC to the coils 12 becomes shorter and therefore efficiency of the preheating is more improved by turning off the AC to the coils 12 after a temperature at the side of being turned on the coils 12 rises up to a first predetermined temperature, and by leaving all of the coils 12, the core 11, the frame 13, and the mold 2 as they are till all of the temperatures of the coils 12, the core 11, the frame 13, and the mold 2 drop down to a second predetermined temperature appropriate to molding.

Though the invention is described base on the above-mentioned embodiment, the invention is not limited to the above-mentioned embodiment. For example, use of the pallet 3 is arbitrary and a structure of the pallet 3 is not specifically restricted. Further, the pallet 3 is not limited to arrangement in a fixed state but is changed to a movable one by riding on such a conveying device as a roller conveyer. In this case, the preheated unfinished stator 1 is able to be automatically carried to a molding station. Furthermore, a shape and a structure of the mold 2 are not restricted.

EXPLANATION OF SYMBOLS

1 Unfinished stator for motor
11 Core
11a Grooves
12 Coils
13 Frame
2 Mold for molding
21 Barrel portion
22 Flange portion
5 Box

What is claimed is:

1. A method of preheating an unfinished stator for a motor, as a premise that the unfinished stator is an intermediate product before a stator as a final product and the stator comprises a core in which a plurality of annular electromagnetic steel sheets are laminated and coils bound at a plurality of grooves formed at an inner peripheral portion of the core at a predetermined distance, wherein the unfinished stator is preheated before being performed molding in which an insulative resin is injected in clearances at least between the core and the coils and is cured, and wherein a mold for molding comprises a hollow and longitudinal barrel portion and a flange portion extending outward from an end in a longitudinal direction of the barrel portion, the method comprising the steps of:

arranging the flange portion of the mold for molding at a horizontal position to turn the barrel portion of the mold for molding upward;

putting an end of a cylindrical and longitudinal frame on the flange portion of the mold for molding in a state where the core of the unfinished stator is fitted in the frame;

covering the frame and the mold for molding with a heat-resistant box of which an underside is opened to surround outsides of the frame and the mold for molding;

turning on an alternative current to the coils in the heat-resistant box to cause the coils to generate heat; and preheating the core, the frame and the mold for molding by the heat which is conducted from the coils.

2. The method of the unfinished stator for the motor according to claim 1, wherein the alternative current to the coils is tuned off after rising up to a first predetermined temperature, and all of the coils, the core, the frame, and the mold for molding are left as they are till temperature drop down to a second predetermined temperature appropriate to molding.

* * * * *